Dec. 6, 1927. 1,651,811

E. FERRABINO

VEHICLE WHEEL

Filed Feb. 11, 1926

Inventor
E. Ferrabino
by
Langner, Parry, Card + Langner
Att'ys

Patented Dec. 6, 1927.

1,651,811

UNITED STATES PATENT OFFICE.

EDOARDO FERRABINO, OF TURIN, ITALY.

VEHICLE WHEEL.

Application filed February 11, 1926, Serial No. 87,662, and in Italy February 16, 1925.

The present invention relates to removable vehicle wheels and has for its object a construction of wheel hub and axle hub providing for an easy mounting and removal of the wheel.

Figure 1:
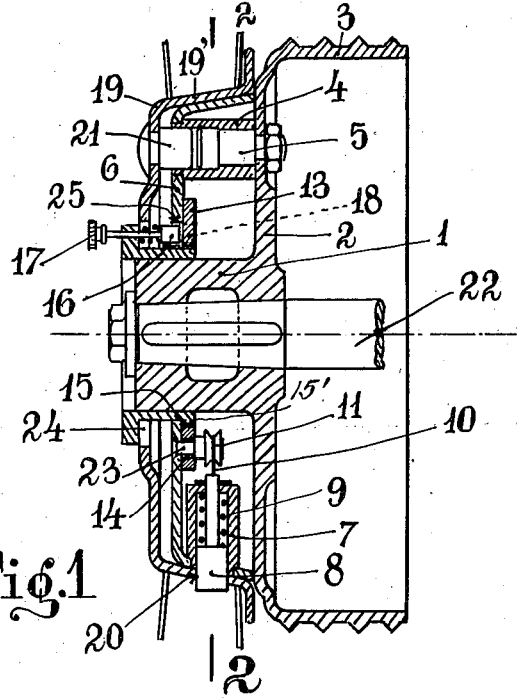
Figure 2:
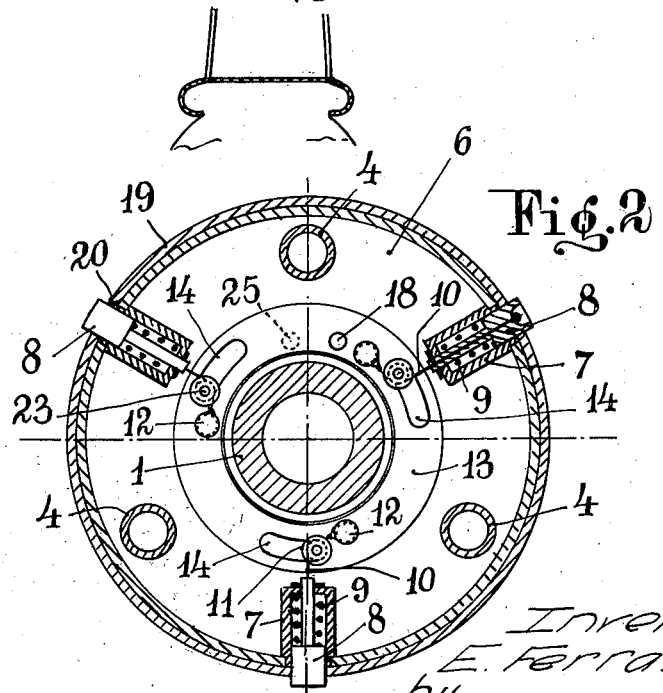

On the annexed drawing is shown by way of example an embodiment of a removable wheel according to this invention and:

Figure 1 is a central view of the same;
Figure 2 is a fragmentary section on line 2—2 of Fig. 1.

In said figures, 1 is the axle hub member fastened on the end of axle 22 and having a flange 2 which in the illustrated embodiment is provided with the brake drum 3. To form the support member for the removable part of the wheel a rim 6 is fastened on said flange 2 by means of sleeves 4 fastened on flange 2 by means of headed bolts 5 and having their ends passing through and engaged with the said rim 6.

In the space intermediate said rim 6 and flange 2 are arranged three radial shells 7 secured on the outer flange of the rim and each enclosing a plunger 8 moved towards the outside by a spring 9 located in the cooperating shell. Each plunger 8 is connected with a cord 10 which passes over a roller 11 pivoted on the front wall of rim 6 and has its opposite end attached to a stud 12 fastened on a ring 13 which is arranged on the internal surface of rim 6 and is rotatably held on the same by means of slots 14 of said ring 13 passed through by the pivots 23 of rollers 11, said pivots being fastened on said rim 6.

The ring 13 is unitary with a sleeve 15 arranged on the outer surface of the hub 1 and projecting beyond the rim 6 said sleeve and ring being held together by interdigitating parts one of which is shown at 15'. In a hole 25 of rim 6 is mounted a spring lock 16 comprising a rod which traverses an elongated slot 26 of the external collar of sleeve 15 and a knob 17 fastened on said rod for the operation of lock 16 from outside. In the ring 13 is provided a hole 18 which is opposite the hole 25 and lock 16 when the ring 13 is in its angular position with respect to rim 6 in which the radial plungers 8 are in retracted position.

The wheel hub is provided with a member 19 having a central hole 24 which may be inserted over the edge of sleeve 15, and provided with a peripheral rim 19' adapted to fit on rim 6. Said peripheral rim 19' of the member 19 has holes 20 for engagement by plungers 8 when the wheel hub is properly arranged on the axle hub, and the front portion of the said member has inside studs 21 adapted to enter the free spaces provided in the ends of sleeves 4 for the driving connection of wheel hub with axle hub.

The wheel is arranged on the hub by locating the wheel hub 19 over the sleeve 15 and arranging its peripheral rim 19' on the rim 6 with holes 20 in register with shells 8 and studs 21 engaged in sleeves 4.

For said operation, plungers 8 must have been previously retracted in their shells 7, this being effected by counterclockwise rotating the ring 13 which is manipulated from outside by the sleeve 15 and by means of any suitable tool or wrench, said manipulation causing studs 12 and cords 10 to move and producing a pull on plungers 8 while by said rotation of ring 13 the lock 16 comes in register and engagement with said holes 16 of ring 13 and 25 of flange 6.

On the lock 16 being released by the manipulation of knob 17, springs 9 cause plungers 8 to move out radially and to produce a pull on studs 12, thus causing a clockwise angular movement of ring 13 and the parts are thus carried again in the position shown on the drawing in which the wheel is locked on the axle hub.

To remove the wheel, the sleeve 15 is rotated counterclockwise and thus the ring 13 is moved until lock 16 is engaged by its spring with the holes 18 and 25 of ring 13 and rim 6, the plungers 8 are thus retracted within their shells 7 against the action of springs 9 and then the wheel may be immediately removed from the axle hub.

Of course the number of radial plungers as 8 and studs 21 may be any desired one and the common actuation of said radial plungers may also be obtained by a rotation in either direction of the central member of the hub.

In any case the described construction provides a removable wheel which is locked in position on the hub and is removed therefrom by means of a very simple operation.

What I claim as my invention and desire to secure by United States Letters Patent is:—

1. Means for removably mounting a vehicle wheel on an axle hub, comprising a support member on said axle hub, a wheel hub adapted to be arranged on said support member, retractible means in said member adapted when expanded to engage said member and wheel hub together and means for actuation of said retractible means.

2. Means for removably mounting a vehicle wheel on an axle hub, comprising a support member on said axle hub, a wheel hub adapted to be arranged on said support member, retractible means in said member adapted when expanded to engage said member and wheel hub together and a part for a common actuation of said retractible means.

3. Means for removably mounting a vehicle wheel on an axle hub, comprising a support member on said axle hub, a wheel hub adapted to be arranged on said support member, retractible means in said member adapted when expanded to engage said member and wheel hub together, a part rotatably mounted on said support member, means connecting said part with said retractible means and a member projecting from said part for its manipulation from outside.

4. Means for removably mounting a vehicle wheel on an axle hub, comprising a support member on said axle hub, a wheel hub adapted to be arranged on said support member, retractible means in said member adapted when expanded to engage said member and wheel hub together, a part rotatably mounted on said support member, springs moving said retractible means into engagement with said wheel hub, means connecting said retractible members with said rotatable part and cooperating means on said rotatable part and support member for locking said rotatable part in position with said retractible members in retracted position.

5. Means for removably mounting a vehicle wheel on an axle hub, comprising a support member on said axle hub, a wheel hub adapted to be arranged on said support member, retractible means in said member adapted when expanded to engage said member and wheel hub together, means for actuation of said retractible means and cooperating means on said support member and wheel hub for their driving engagement.

6. Means for removably mounting a vehicle wheel on an axle hub, comprising a support member on said axle hub, a wheel hub adapted to be arranged on said support member, retractible means in said member adapted when expanded to engage said member and wheel hub together, means for actuation of said retractible means and cooperating projections and recesses on the front facing portions of said wheel hub and support member for their driving engagement.

7. Means for removably mounting a vehicle wheel on an axle hub, comprising a support member on said axle hub, a wheel hub adapted to be arranged on said support member, parts connecting said support member with said axle hub and having front recesses, studs projecting frontally from said wheel hub to engage said recesses, retractible means in said support member adapted when expanded to engage said member and wheel hub together and means for actuation of said retractible means.

In testimony whereof I have signed my name to this specification.

EDOARDO FERRABINO.